(12) United States Patent
Saito et al.

(10) Patent No.: US 10,936,414 B2
(45) Date of Patent: Mar. 2, 2021

(54) DISPLAY DEVICE FOR VEHICLE

(71) Applicant: NIPPON SEIKI CO., LTD., Niigata (JP)

(72) Inventors: Ryuji Saito, Niigata (JP); Shin Usuda, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 158 days.

(21) Appl. No.: 16/312,810

(22) PCT Filed: Jun. 22, 2017

(86) PCT No.: PCT/JP2017/022980
§ 371 (c)(1),
(2) Date: Dec. 21, 2018

(87) PCT Pub. No.: WO2018/003649
PCT Pub. Date: Jan. 4, 2018

(65) Prior Publication Data
US 2020/0310910 A1    Oct. 1, 2020

(30) Foreign Application Priority Data

Jun. 28, 2016 (JP) .............................. JP2016-127661
Jun. 19, 2017 (JP) ................................. 2017-119470

(51) Int. Cl.
G06F 11/00      (2006.01)
G06F 11/10      (2006.01)
G01K 13/00      (2021.01)

(52) U.S. Cl.
CPC .......... G06F 11/1068 (2013.01); G01K 13/00 (2013.01)

(58) Field of Classification Search
None
See application file for complete search history.

(56) References Cited

U.S. PATENT DOCUMENTS

| 2004/0172172 A1* | 9/2004 | Kubota | G08G 1/20 |
| | | | 701/1 |
| 2006/0104115 A1* | 5/2006 | Chun | G11C 16/26 |
| | | | 365/185.17 |

(Continued)

FOREIGN PATENT DOCUMENTS

| JP | 2001-273197 A | 10/2001 |
| JP | 2004-157434 A | 6/2004 |

(Continued)

OTHER PUBLICATIONS

International Search Report issued in corresponding International Patent Application No. PCT/JP2017/022980, dated Jul. 18, 2017, with English Translation.

*Primary Examiner* — Mujtaba M Chaudry
(74) *Attorney, Agent, or Firm* — McDermott Will & Emery LLP (57) ABSTRACT

The purpose of the present invention is to provide a display device for a vehicle which is capable of avoiding NAND flash memory data loss. Provided is a display device for a vehicle, comprising: a display unit 6 which displays vehicle information; a NAND flash memory 1 which stores, together with an error correction code, data which is related to the display of the display unit 6; and a control unit (for example, a second control unit 2) which causes the display 6 to display the vehicle information using said data. When a load upon the vehicle is low, such as when a switch key for commencing the driving of the vehicle is off, the control unit (for example, a first control unit 3), as a data loss avoidance process, assesses, with the error correction code, whether an error is present in the data which is recorded in the NAND flash memory 1. If the error is present in the data, the control unit (for example, the first control unit 3) corrects the error with the error correction code.

6 Claims, 4 Drawing Sheets

(56) References Cited

U.S. PATENT DOCUMENTS

| | | | | |
|---|---|---|---|---|
| 2008/0294949 | A1* | 11/2008 | Sugahara | G06F 11/1068 |
| | | | | 714/718 |
| 2008/0309163 | A1* | 12/2008 | Hashimoto | H02J 7/0029 |
| | | | | 307/31 |
| 2009/0044076 | A1 | 2/2009 | Sugahara | |
| 2016/0259577 | A1* | 9/2016 | Park | G06F 13/1668 |
| 2017/0123898 | A1* | 5/2017 | Ryabinin | G06F 3/0679 |
| 2019/0243772 | A1* | 8/2019 | Roberts | G06F 3/0608 |

FOREIGN PATENT DOCUMENTS

| | | |
|---|---|---|
| JP | 2008-293579 A | 12/2008 |
| JP | 2009-042911 A | 2/2009 |
| JP | 2009-137486 A | 6/2009 |
| JP | 5045912 B2 | 10/2012 |
| JP | 2015-030394 A | 2/2015 |
| JP | 2015-148859 A | 8/2015 |

* cited by examiner

DISPLAY DEVICE FOR VEHICLE

CROSS REFERENCE

This application is the U.S. National Phase under 35 U.S.C. § 371 of International Application No. PCT/W2017/022980, filed on Jun. 22, 2017, which claims the benefit of Japanese Application No. 2016-127661, filed on Jun. 28, 2016 and Japanese Application No. 2017-119470, filed on Jun. 19, 2017, the entire contents of each are hereby incorporated by reference.

TECHNICAL FIELD

The present invention relates to a display device (a display device for a vehicle) installable in a vehicle such as a car and, more particularly, to a display device for a vehicle (including a meter for a vehicle) capable of avoiding data loss in a NAND flash memory that stores data related to display of a display unit (more specifically, program data for activating a control unit that controls display of the display unit).

BACKGROUND ART

For example, Patent Literature 1 discloses a display device for a vehicle, the display device for a vehicle (an image display device 2) being capable of displaying an analog meter image 15 including an indicator needle 16 and an indicator-needle rotation area 17 and displaying a ring image 18 along the outer circumference of the indicator-needle rotation area 17 (see the abstract of Patent Literature 1).

Furthermore, for example, Patent Literature 2 discloses a meter unit for a vehicle, the meter unit 1 for a vehicle being capable of presenting or displaying analog meters 501, 504, a lane-guide display unit 530, a guidance display unit 531, and the like, in the front in a depth direction through three-dimensional image processing (see the abstract and the paragraphs [0035], [0037] of Patent Literature 2).

Moreover, for example, Patent Literature 3 discloses a display device for a vehicle, a meter 10 (display unit) in the display device for a vehicle being capable of depicting or displaying a speed meter, an indicator, and the like, with a polygon and a texture (see claim 1, claim 2, and the paragraph [0013] of Patent Literature 3).

CITATION LIST

Patent Literature

Patent Literature 1: Japanese Laid-open Patent Publication No. 2004-157434
Patent Literature 2: Japanese Laid-open Patent Publication No. 2009-137486
Patent Literature 3: Japanese Patent No. 5045912

SUMMARY OF THE INVENTION

Problems to be Solved by the Invention

As disclosed in for example Patent Literatures 1 to 3, it is preferable that the display unit in the display device for a vehicle has a high design quality. In other words, in recent years, there has been an increasing amount of data related to the display of the display unit in the display device for a vehicle. In addition, nowadays, the size of the display unit in the display device for a vehicle is likely to be large, and types of vehicle information displayed on the display unit in the display device for a vehicle tends to increase. Thus, the amount of data related to the display of the display unit in the display device for a vehicle tends to increase.

For example, a ROM 282 in Patent Literature 2 stores meter depicting software, graphics data necessary to depict image meters 504A, 504D, 501, 506, 507, 509, and font data on numbers for indicating the speed on a digital speed meter 504D (see the paragraph [0038] of Patent Literature 2). For example, a ROM 22 in Patent Literature 3 is composed of a non-volatile semiconductor memory, such as EEPROM or flash memory, and it stores data representing various polygons that correspond to images 11 to 17 representing a vehicle status, various setting mode images 18, and the like, and data (texel data) representing the texture that corresponds to each polygon, in addition to image display programs for executing various processes executed by a meter ECU 21 and luminance-value setting programs (see the paragraph [0015] of Patent Literature 3).

The inventor has recognized that, when there is an increase in the amount of data stored in the ROM, the ROM is preferably a NAND flash memory in terms of manufacturing costs. In other words, the NAND flash memory is inexpensive as compared with EEPROM or NOR flash memory. It is, however, known that bit errors easily occur in the NAND flash memory so that it is difficult to properly read the value of the target cell.

In other words, the inventor has recognized the necessity of avoiding data loss when a NAND flash memory is used as the storage unit or the ROM in the display device for a vehicle. Particularly, the inventor has recognized the necessity of avoiding data loss in the NAND flash memory when a switch such as the ignition key switch of the vehicle, is off, i.e., when accesses to the NAND flash memory are stopped.

In addition, the inventors have recognized the need of avoiding data loss in the NAND flash memory even when a switch such as the ignition key switch of the vehicle is on. The inventors, however, have also recognized the need of giving priority to driving of the vehicle over avoidance of data loss in the NAND flash memory.

One of the objects of the present invention is to provide a display device for a vehicle capable of avoiding data loss in a NAND flash memory. Other objects of the present invention may be understood by a person skilled in the art by referring to the aspects and the preferred embodiments shown by example below and the attached drawings.

Solution to Problem

For easy understanding of the summary of the present invention, aspects according to the present invention are shown by example below.

In a first aspect, a display device for a vehicle includes: a display unit which displays vehicle information; a NAND flash memory which stores, together with an error correction code, data which is related to display of the display unit; and a control unit which causes the display to present the vehicle information by using the data, wherein the control unit determines whether a load on the vehicle is low, the control unit determines, with the error correction code, whether an error is present in the data stored in the NAND flash memory when the load on the vehicle is low as a data-loss avoidance process, and the control unit corrects the error with the error correction code when the error is present in the data.

According to the first aspect, data loss is avoided when a load on the vehicle is low, and therefore the display may present vehicle information based on proper data (corrected or recovered data).

In a second aspect according to the first aspect, the control unit may determine that the load on the vehicle is low when a switch for starting driving of the vehicle is off, the control unit may determine whether a first predetermined time has elapsed while the switch is off, and the control unit may execute the data-loss avoidance process after the first predetermined time has elapsed.

According to the second aspect, an error present in data stored in the NAND flash memory may be corrected after the first predetermined time has elapsed while the switch is off. In other words, when an error is present in data due to an external environment such as heat, the error is corrected on a regular basis due to elapse of the first predetermined time. Therefore, according to the second aspect, data loss is avoided so that the display may present vehicle information based on proper data (corrected or recovered data).

In a third aspect according to the second aspect, the control unit may include: a first control unit which determines whether the switch is changed from an OFF state to an ON state; and a second control unit which causes the display to present the vehicle information by using the data, the second control unit may be set in a standby state on a constant basis while the switch is off, while the switch is off, the first control unit may be set in a standby state and get activated in a cycle shorter than the first predetermined time to, in an operating state, determine whether the first predetermined time has elapsed, and the first control unit may shift from the operating state to the standby state when the first predetermined time has not elapsed.

According to the third aspect, the control unit is composed of the first control unit and the second control unit, and the second control unit, which causes the display to present vehicle information, is set in the standby state on a constant basis while the switch is off. This reduces power consumption of the second control unit. Activation is executed in a period shorter than the first predetermined time while the switch is off. The first control unit is not always set in the operating state, and the first control unit is set in the operating state when the first control unit gets activated, whereby power consumption of the first control unit is reduced.

In a fourth aspect according to the third aspect, after the first predetermined time has elapsed, the first control unit may determine, with the error correction code, whether an error is present in the data stored in the NAND flash memory while in the operating state, and when the error is present in the data, the first control unit may correct the error with the error correction code.

According to the fourth aspect, not the second control unit but the first control unit corrects errors present in data stored in the NAND flash memory. In other words, the second control unit, which causes the display to present vehicle information, is set in the standby state on a constant basis while the switch is off, whereby power consumption of the second control unit is reduced.

In a fifth aspect according to the fourth aspect, the first control unit may determine whether the switch is changed from the OFF state to the ON state while it is determined, with the error correction code, whether an error is present in the data stored in the NAND flash memory, and when the switch is changed from the OFF state to the ON state, the first control unit may stop a determination as to whether an error is present in the data and activate the second control unit.

According to the fifth aspect, when the switch is turned on again, a determination may be stopped as to whether an error is present in data in the NAND flash memory. If the determination is not stopped, the second control unit does not get activated until all errors in the entire NAND flash memory have been corrected, and therefore vehicle information is not presented on the display unit. In other words, according to the fifth aspect, the display of vehicle information is promptly executable in response to the turn-on of the switch.

In a sixth aspect according to the fourth or the fifth aspect, the NAND flash memory may have a memory controller built-in which controls an error in the data stored in the NAND flash memory, and when the first predetermined time has elapsed, the first control unit may cause the memory controller to detect whether an error is present in the data stored in the NAND flash memory and cause the memory controller to correct the error while in the operating state.

According to the sixth aspect, the NAND flash memory has the memory controller built-in. In other words, the first control unit only has to transmit a predetermined command to the memory controller while the switch is off. Furthermore, as the NAND flash memory has the memory controller built-in, the second control unit is capable of using or sharing the memory controller when reading data on vehicle information stored in the NAND flash memory.

In a seventh aspect according to any one of the first to the sixth aspects, the display device for a vehicle may further include a temperature detecting unit which detects a usage environment temperature, wherein the control unit may determine when to execute the data-loss avoidance process based on the usage environment temperature.

The data retention period of the NAND flash memory, i.e., the time before data loss and bit error occurrence or the probability thereof is based on the usage environment temperature; therefore, according to the seventh aspect, it is possible to determine when to execute the data-loss avoidance process based on the usage environment temperature, thereby further avoiding data loss.

In an eighth aspect according to any one of the second to the sixth aspects, the display device for a vehicle may further include a temperature detecting unit which detects a usage environment temperature, wherein the control unit may set the first predetermined time such that the higher the usage environment temperature, the shorter the first predetermined time.

The higher the usage environment temperature, the shorter the time before data loss and bit error occurrence or the higher the probability of bit error occurrence; therefore, according to the eighth aspect, the higher the usage environment temperature, the more promptly the data-loss avoidance process may be executed.

In a ninth aspect according to any one of the first to the sixth aspects, the control unit may determine whether a second predetermined time has elapsed after the data-loss avoidance process is properly completed, and the control unit may execute the data-loss avoidance process after the second predetermined time has elapsed.

According to the ninth aspect, even after the data-loss avoidance process is executed once, it is executable afterward, whereby the data-loss avoidance process is periodically repeatable.

A person skilled in the art may easily understand that the aspect according to the present invention shown by example is further modifiable without departing from the scope of the present invention.

BRIEF DESCRIPTION OF THE DRAWINGS

FIG. 1(A) shows an example of the configuration of a display device for a vehicle according to the present invention, and each of FIG. 1(B) and FIG. 1(C) shows a modification of the display device for a vehicle in FIG. 1(A).

MODE FOR CARRYING OUT THE INVENTION

Preferred embodiments described below are used for easy understanding of the present invention. Therefore, the person skilled in the art should note that the embodiments explained below place no unreasonable limitations on the present invention.

Hereafter, a "first embodiment" is explained.

Figure 1:
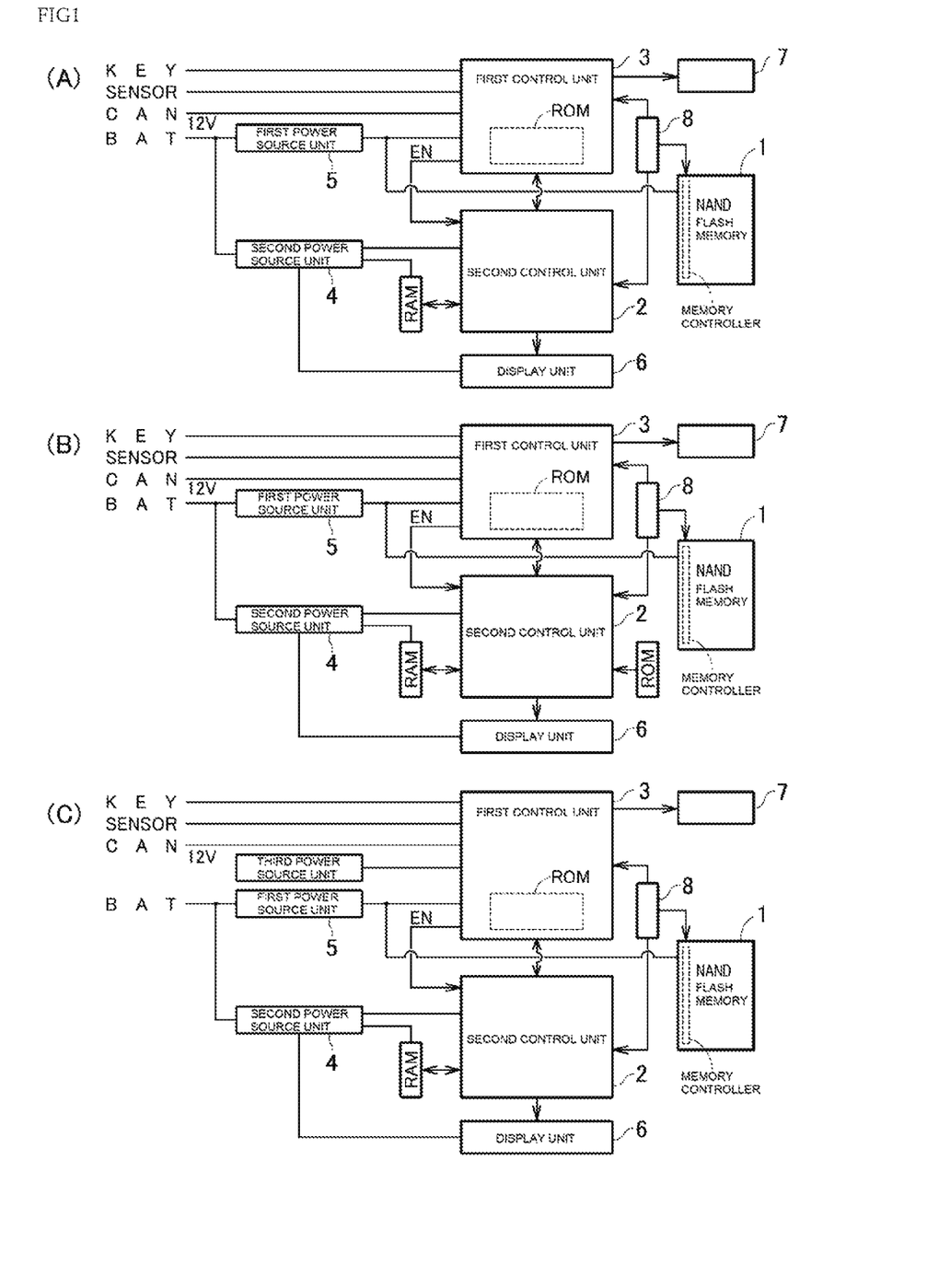

FIG. 1(A) shows an example of the configuration of a display device for a vehicle according to the present invention. As shown in FIG. 1(A), the display device for a vehicle may include, as control units, for example a first control unit 3 and for example a second control unit 2, and the second control unit 2 may cause a display 6 to present vehicle information by using data stored in a NAND flash memory 1. The example of the configuration of the display device for a vehicle in FIG. 1(A) is not a limitation, and the first control unit 3 and the second control unit 2 may be configured as a single control unit. Alternatively, the display device for a vehicle may include, as a control unit, for example three or more control units.

The control unit (e.g., the first control unit 3 in FIG. 1(A)) in the display device for a vehicle is capable of determining whether the first predetermined time (e.g., two weeks or 360 hours) has elapsed while a switch KEY is off, which is for example an ignition key switch for starting the driving of the vehicle. In the example of FIG. 1(A), the first control unit 3 is electrically connected to the switch KEY, for example, to receive output from the switch KEY, thereby determining whether the switch KEY is in the ON state or the OFF state.

For example, the first control unit 3 is capable of determining whether the first predetermined time has elapsed after the switch KEY is changed from the ON state to the OFF state.

The first control unit 3 in FIG. 1(A) may be electrically connected to for example an in-vehicle network CAN, which is Controller Area Network, so as to determine whether the switch KEY is in the ON state or the OFF state via the in-vehicle network CAN. In other words, the first control unit 3 does not need to be directly connected to the switch KEY, and it may determine information (the state of the switch KEY) in the in-vehicle network CAN from a vehicle-mounted device (e.g., electronically controlled unit) that is not shown. It is obvious that the example of the configuration of the first control unit 3 in FIG. 1(A) is not a limitation and a connection does not need to be established with the in-vehicle network CAN.

Furthermore, while the switch KEY is off, a load on the vehicle, specifically, a load on the display device for a vehicle, more specifically, a load on the control unit (particularly, the second control unit 2) in the display device for a vehicle is low, and the first control unit 3 is capable of determining that a load on the vehicle is low or a load on the vehicle is zero.

As shown in FIG. 1(A), the first control unit 3 is electrically connected to a sensor SENSOR, such as wheel speed sensor or fuel sensor, so as to determine for example meter information (e.g., the speed or the remaining amount of fuel of the corresponding vehicle) related to meters of the corresponding vehicle. The first control unit 3 may be electrically connected to an indicator unit 7 such as analog indicator needle or LED and may drive the indicator unit 7 based on meter information. It is obvious that the first control unit 3 does not need to determine meter information or does not need to cause the driver, for example, to recognize meter information.

Furthermore, the first control unit 3 may be configured to communicate with the second control unit 2 so that, for example, meter information may be transmitted to the second control unit 2.

The first control unit 3 is typically a microcomputer including a CPU (not shown) and a storage unit, and the storage unit may include a ROM (e.g., EEPROM or NOR flash memory) that stores programs causing the CPU to execute predetermined operation and a RAM (not shown) that is a work area for the CPU.

The display device for a vehicle in FIG. 1(A) includes a first power source unit 5 (e.g., linear regulator) that generates power for the first control unit 3 from a direct-current power line BAT that is connected to a vehicle-mounted battery (not shown) and has output (e.g., 12 [V]) of the vehicle-mounted battery. As shown in FIG. 1(A), the first power source unit 5 is also capable of generating power for, for example, the NAND flash memory 1 from the direct-current power line BAT. In the example of FIG. 1(A), the first power source unit 5 is capable of generating the power for the first control unit 3 and the power for the NAND flash memory 1 on a constant basis independently of the state of the switch KEY.

The display device for a vehicle is a meter for a vehicle when the first control unit 3 drives the indicator unit 7 based on meter information from for example the sensor SENSOR. While the switch KEY for starting the driving of the vehicle is off, the first control unit 3 is capable of stopping driving of the indicator unit 7. While the switch KEY for starting the driving of the vehicle is on, the first control unit 3 increments the count value of for example a counter (not shown) so as to determine the measured time (operating time) of the first control unit 3. The first control unit 3 may cause the counter to continuously count up while the switch KEY for starting the driving of the vehicle is off. However, in order to reduce power consumption, it is preferable that the first control unit 3 shifts from the operating state to the standby state and the counter is set for non-operating while the switch KEY for starting the driving of the vehicle is off.

When the first control unit 3 is set in the standby state, the first control unit 3 decrements the count value of for example a timer (not shown) so as to determine when to activate the first control unit 3. The time when to activate is set in a cycle of for example one hour, and therefore the first control unit 3 may get activated in for example every one hour, i.e., return from the standby state to the operating state in for example every one hour. At the moment when the first control unit 3 returns from the standby state to the operating state, the first control unit 3 adds the count corresponding to, for example, one hour to the count value of the counter so as to compensate for the measured time of the first control unit 3. Then, as long as the standby state of the first control unit 3 continues, the first control unit 3 increments the count value of the counter in the standby state.

The first control unit 3 is capable of determining whether the first predetermined time (e.g., 2 weeks or 360 hours) has elapsed by referring to the count value of the counter or comparing the count value of the counter with a threshold while the switch KEY for starting the driving of the vehicle is off. When the measured time, which corresponds to the count value of the counter, is shorter than the first predetermined time, that is, when the first predetermined time has not elapsed, the first control unit 3 may reset the count value of the timer to the default value and shift from the operating state to the standby state.

After the first control unit 3 is repeatedly activated, the measured time, which corresponds to the count value of the counter, exceeds the first predetermined time. When the measured time of the first control unit 3 is the first predetermined time, the first control unit 3 may determine that the first predetermined time has elapsed. When the switch KEY is continuously off for, for example, more than two weeks, accesses to the NAND flash memory 1 have been stopped for, for example, two weeks, which may cause bit errors in the NAND flash memory 1 due to external environment such as heat. Thus, as the NAND flash memory 1 easily causes bit errors, it is preferable that errors in data are corrected every time the first predetermined time has elapsed, that is, on a regular basis.

In other words, when the NAND flash memory 1 stores data together with an error correction code (ECC: Error Correction Code), a bit error beyond the correction capability of the error correction code causes data loss. When the correction capability is for example 4 bits per for example 528 bytes, the occurrence of 5 bit errors per 528 bytes disables correction on the errors in the data and causes data loss.

In FIG. 1(A), the NAND flash memory 1 has a memory controller built-in, and the memory controller is capable of calculating an error correction code with a predetermined algorithm and writing the error correction code together with data in the NAND flash memory 1. Furthermore, when the memory controller reads data, it may detect a bit error with the error correction code and write proper data in the NAND flash memory 1. Furthermore, the first control unit 3 only has to transmit a predetermined command (command to execute a refresh process) to the memory controller.

To reduce power consumption, the second control unit 2 preferably shifts from the operating state to the standby state while the switch KEY for starting the driving of the vehicle is off, and more preferably, the second control unit 2 is set in the standby state on a constant basis. For example, the first control unit 3 may stop transmitting an activation signal EN for activating the second control unit 2, thereby setting the second control unit 2 in the standby state.

The display device for a vehicle in FIG. 1(A) includes a second power source unit 4 (e.g., a switching power supply) that generates power for the second control unit 2 from the direct-current power line BAT. As shown in FIG. 1(A), the second power source unit 4 includes for example multiple switching power supplies so as to generate power for a display unit 6, which is for example an LCD, from the direct-current power line BAT and generate power for a RAM (e.g., DRAM), which is part of a storage unit of the second control unit 2, from the direct-current power line BAT. In the example of FIG. 1(A), the second power source unit 4 may stop generating or supplying power to the second control unit 2, and the like, while the switch KEY is off.

The second control unit 2 is typically a graphic controller including a GPU (not shown) and a storage unit, and the storage unit may include the NAND flash memory 1 that stores programs causing the GPU to execute predetermined operation and a RAM that is a work area for the GPU. The display device for a vehicle in FIG. 1(A) includes a bus switch 8 so as to electrically connect the second control unit 2 and the NAND flash memory 1 while the switch KEY for starting the driving of the vehicle is on. Conversely, while the switch KEY is off, the second control unit 2 and the NAND flash memory 1 may be electrically disconnected, and the first control unit 3 and the NAND flash memory 1 may be electrically connected.

Furthermore, the second control unit 2 enables the display 6 to present vehicle information (here, the vehicle information may be for example meter information and the meter information may be transmitted from for example the first control unit 3 to the second control unit 2) by using data stored in the NAND flash memory 1. In other words, power consumption of the second control unit 2 is higher than power consumption of the first control unit 3. Therefore, to reduce power consumption of the entire display device for a vehicle, it is preferable that not the second control unit 2 but the first control unit 3 returns from the standby state to the operating state for example every one hour and not the second control unit 2 but the first control unit 3 transmits a predetermined command to the memory controller of the NAND flash memory 1 while the switch KEY for starting the driving of the vehicle is off.

Furthermore, while the switch KEY for starting the driving of the vehicle is on, the second control unit 2 causes the memory controller to read data stored in the NAND flash memory 1. Therefore, when the second control unit 2 accesses the NAND flash memory 1, the memory controller detects a bit error with the error correction code so as to write proper data in the NAND flash memory 1.

The NAND flash memory 1 is capable of storing program data for activating the second control unit 2 that controls display of the display unit 6 and is capable of storing setting data necessary for display of the display unit 6. In addition, the NAND flash memory 1 is capable of storing image data (e.g., still image data, moving image data, or polygon data) used for display of the display unit 6. The image data may be for example image data (meter information) to improve the design quality of the indicator unit 7, which is an analog indicator needle, may be image data (meter information) that forms the number for the speed of the corresponding vehicle, or may be image data (at least one or any combination of forward vehicle information, road surface information, backward vehicle information, route information, and the like) related to other types of vehicle information.

FIG. 1(B) shows a modification of the display device for a vehicle in FIG. 1(A). When the NAND flash memory 1 stores program data, the program data may be duplicated. Specifically, in the example of FIG. 1(B), the second control unit 2 may include, as a storage unit, a ROM that is for example a NOR flash memory in addition to the NAND flash memory 1 and the RAM. The NAND flash memory 1 may have a decline in data memory (data retention) due to degradation with aging (writing frequency). If there is the occurrence of a loss in program data stored in the NAND flash memory 1, the second control unit 2 is unable to be activated with the program data; therefore, program data (program data for boot) may be stored in a ROM, which is for example a NOR flash memory, having a longer operating life (higher data retention) than the operating life of the NAND flash memory 1.

Alternatively, in the example of FIG. 1(B), program data for the second control unit 2 may be stored in only the ROM, which is for example a NOR flash memory, having a longer operating life (higher data retention) than the operating life of the NAND flash memory 1. Furthermore, setting data that is important data for operation of the second control unit 2 may be stored in only the ROM that is for example a NOR flash memory. Alternatively, only large image data in volume may be stored in the NAND flash memory 1. As the occurrence of a loss in image data merely causes dot defect or discoloration, operation of the second control unit 2 is continuable.

FIG. 1(C) shows another modification of the display device for a vehicle in FIG. 1(A). A vehicle-mounted battery may deteriorate when the switch KEY is not on for a long time. In the example of FIG. 1(C), a power source unit of the first control unit 3 may be duplicated. Specifically, the display device for a vehicle may include a third power source unit, such as button battery, supercapacitor, or secondary battery. For example, the first control unit 3 may monitor the voltage of the vehicle-mounted battery and, when the vehicle-mounted battery deteriorates, activate the third power source unit so that an error in data in the NAND flash memory 1 is corrected based on the electric power of the third power source unit, whereby defects in data may be avoided.

Figure 2:
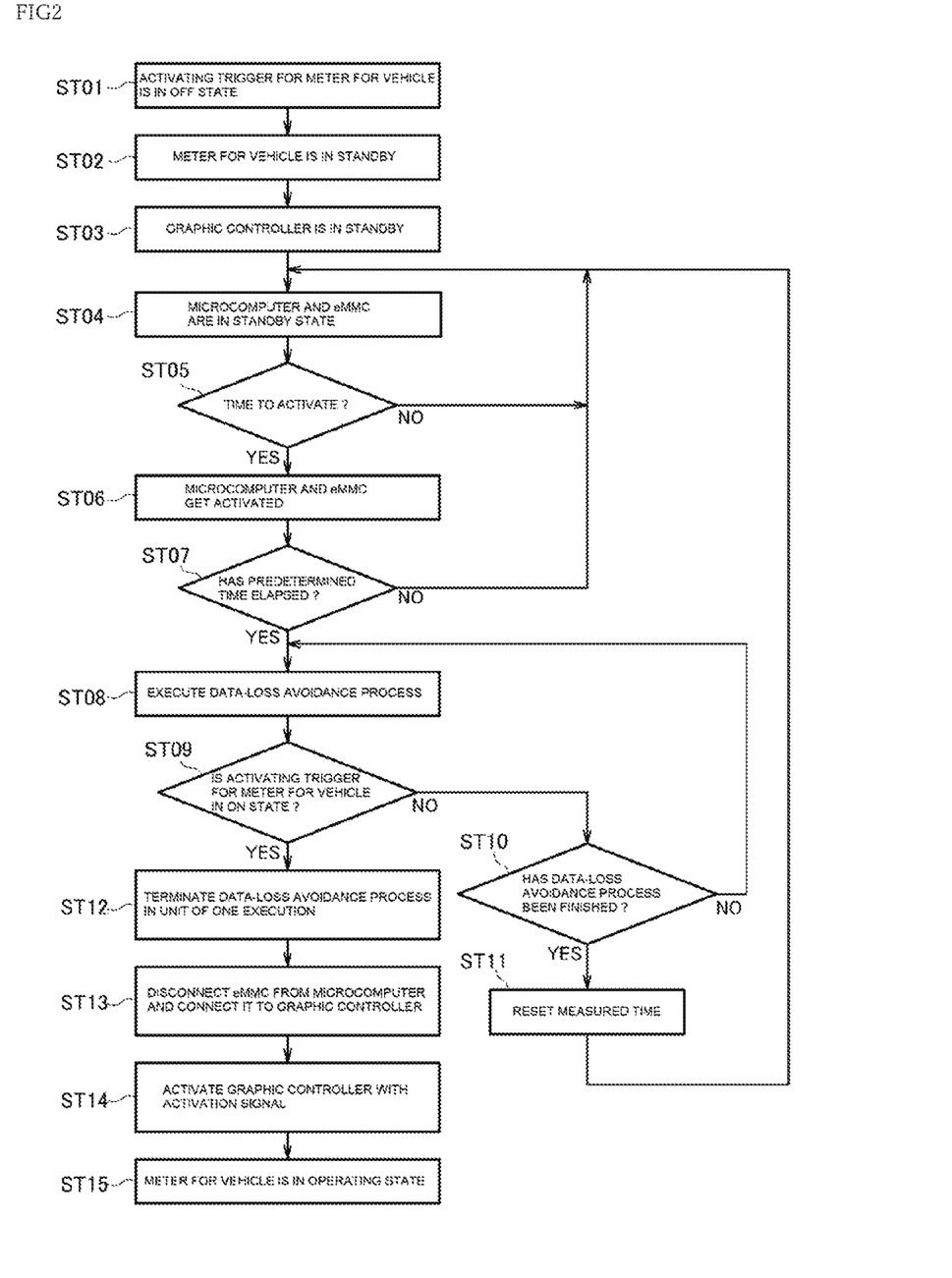
FIG. 2 shows a flowchart illustrating an example of operation of the display device for a vehicle (a first embodiment) in FIG. 1(A).

FIG. 2 shows a flowchart illustrating an example of operation of the display device for a vehicle (the first embodiment) in FIG. 1(A). In the example of FIG. 2, the display device for a vehicle, the first control unit 3, the second control unit 2, and the NAND flash memory 1 in FIG. 1(A) are a meter for a vehicle, a microcomputer, a graphic controller, and an eMMC (Embedded Multi Media Card), respectively.

At Step ST01 in FIG. 2, the activating trigger for the meter for a vehicle (the display device for a vehicle) is in the OFF state. Specifically, the microcomputer (the first control unit 3) detects that the switch KEY for starting the driving of the vehicle is in the OFF state. Then, at Step ST02, the meter for a vehicle is set in the standby state. Specifically, the microcomputer cancels driving of the indicator unit 7 to stop the meter function. Then, at Step ST03, the graphic controller (the second control unit 2) is set in the standby state. Specifically, the microcomputer stops transmitting the activation signal EN.

Then, at Step ST04, the microcomputer and the eMMC (the NAND flash memory 1) are set in the standby state. Specifically, the microcomputer may control the first power source unit 5 so as to stop power supply to the memory controller of the eMMC. Furthermore, the microcomputer prepares for the timer and shifts from the operating state to the standby state. Then, at Steps ST05, ST06, the microcomputer and the eMMC get activated in a cycle shorter than the first predetermined time. Specifically, after being activated due to interruption from the timer, the microcomputer controls the first power source unit 5 so as to resume power supply to the memory controller of the eMMC.

Then, at Steps ST07, ST08, when the first predetermined time has elapsed, the microcomputer enables execution of a data-loss avoidance process. Specifically, the microcomputer causes the memory controller to execute a refresh process on the entire area of the NAND flash memory 1.

Then, at Step ST09, the microcomputer may determine whether the switch KEY is changed from the OFF state to the ON state. When the switch KEY is continuously off, at Step ST10, the microcomputer may determine whether the refresh process has been finished for the entire area of the NAND flash memory 1. When the refresh process is terminated, at Step ST11, the microcomputer may reset the count value (the measured time) of the counter.

When the switch KEY is turned on in the middle of the refresh process, at Step ST12, the microcomputer may give a command to the memory controller so as to stop the refresh process. Here, when the refresh process is stopped, the microcomputer does not reset the measured time. The reason is because the refresh process is to be promptly executed when the switch KEY is turned off again.

Then, at Step ST13, the microcomputer controls the bus switch 8 so that the microcomputer and the eMMC may be electrically disconnected and the graphic controller and the eMMC may be electrically connected. Then, at Step ST14, the microcomputer transmits the activation signal EN to the graphic controller. Thus, the graphic controller gets activated so as to read program data for the eMMC and cause the display 6 to present vehicle information (Step ST15). Furthermore, the microcomputer may resume driving of the indicator unit 7 (Step ST15).

Hereafter, a "second embodiment" is explained.

Figure 3:
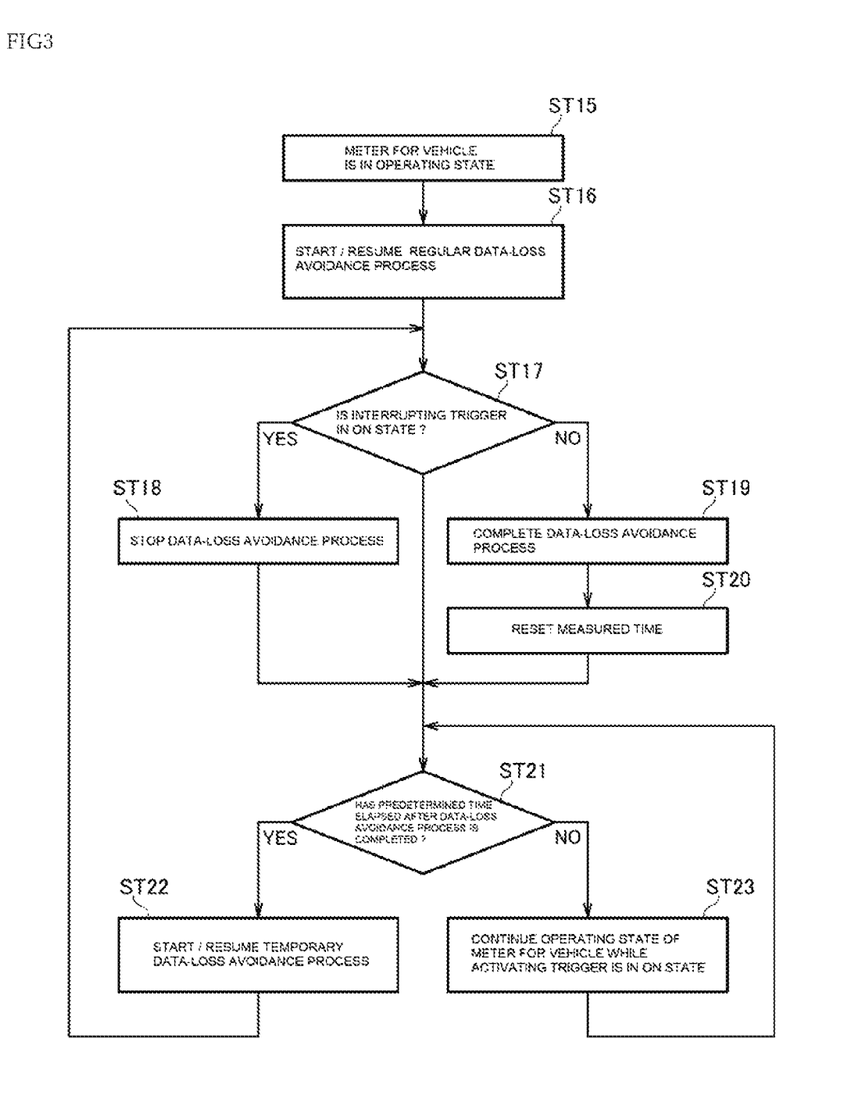
FIG. 3 shows a flowchart illustrating an example of operation of the display device for a vehicle (a second embodiment) in FIG. 1(A).

FIG. 3 shows a flowchart illustrating an example of operation of for example the display device for a vehicle (the second embodiment) in FIG. 1(A). In the example of FIG. 3, the display device for a vehicle, the first control unit 3, the second control unit 2, and the NAND flash memory 1 in FIG. 1(A) are a meter for a vehicle, a microcomputer, a graphic controller, and an eMMC (Embedded Multi Media Card), respectively.

According to the first embodiment, when the switch KEY is changed from the OFF state to the ON state, the microcomputer may give a command to the memory controller so as to stop the refresh process at Step ST12 of FIG. 2. In other words, the microcomputer may always electrically connect the graphic controller and the eMMC while the switch KEY is on. Conversely, according to the second embodiment, the microcomputer may temporarily electrically disconnect the graphic controller and the eMMC to execute the refresh process while the switch KEY is on. Here, the microcomputer executes the refresh process when a load on the vehicle is low. The second embodiment is explained in detail below.

At Step ST15 of FIG. 3, the activating trigger for the meter for a vehicle (the display device for a vehicle) is in the ON state. Specifically, the microcomputer (the first control unit 3) detects that the switch KEY for starting the driving of the vehicle is in the ON state. For example, when the switch KEY is turned on, the microcomputer transmits the activation signal EN to the graphic controller in a state where the graphic controller and the eMMC are electrically connected. Thus, the graphic controller gets activated and reads program data for the eMMC.

Then, at Step ST16, the microcomputer starts or resumes a regular data-loss avoidance process. Preferably, the regular data-loss avoidance process is always executed after the graphic controller has completed reading program data for the eMMC. Specifically, after the graphic controller has completed reading program data for the eMMC, the microcomputer controls the bus switch 8 so that the microcomputer and the eMMC are electrically connected. Then, the microcomputer causes the memory controller to execute the refresh process on the entire area of the eMMC (the NAND flash memory 1) as the regular data-loss avoidance process.

It is preferable that the regular data-loss avoidance process is periodically repeated even in a state where the switch KEY is on. Furthermore, while the switch KEY is on, the regular data-loss avoidance process does not need to be repeated and may be executed once after the switch KEY is turned on.

At Step ST17 of FIG. 3, the microcomputer determines that the interrupting trigger for the data-loss avoidance process is in the ON state when a load on the vehicle is high in the middle of the regular data-loss avoidance process. When it is determined that the interrupting trigger is in the ON state, the microcomputer stops the data-loss avoidance process at Step ST18.

Conversely, at Step ST19, after the data-loss avoidance process is completed while the interrupting trigger is in the OFF state, the microcomputer resets the count value of the counter (the counter may be different from or the same as the counter in the first embodiment) at Step ST20 and, after it is reset, continuously counts up with the counter so as to determine the measured time (operating time) of the microcomputer after the data-loss avoidance process is completed. Thus, the microcomputer enables periodically repeated execution of the regular data-loss avoidance process.

Then, at Step ST21, ST22, when the measured time corresponding to the count value of the counter exceeds a second predetermined time (predetermined time), i.e., the second predetermined time has elapsed after the data-loss avoidance process is completed, the microcomputer starts or resumes a temporary data-loss avoidance process.

Conversely, at Steps ST21, ST23, when the second predetermined time has not elapsed after the data-loss avoidance process is completed, the microcomputer continues the operating state of the meter for a vehicle while the activating trigger for the meter for a vehicle is in the ON state.

According to the second embodiment, the start point for determining whether the second predetermined time has elapsed is the point at which the previous data-loss avoidance process is completed. Conversely, according to the first embodiment, the start point for determining whether the first predetermined time has elapsed is, for example, the point at which the switch KEY is changed from the ON state to the OFF state. When the second embodiment and the first embodiment are combined, i.e., when the data-loss avoidance process is executed periodically independently from the state (the ON state/the OFF state) of the switch KEY, the second predetermined time may be set to be identical to the first predetermined time, and each of the second predetermined time and the first predetermined time is, for example, two hours.

It is obvious that the second predetermined time when the switch KEY is in the ON state may be different from the first predetermined time when the switch KEY is in the OFF state and, in the ON state, the microcomputer may access a partial area of the NAND flash memory 1 and correct a data error present only in the area; thus, for example the second predetermined time may be set shorter than the first predetermined time.

Basically, the microcomputer periodically repeats the regular data-loss avoidance process each time the second predetermined time has elapsed according to the second embodiment while the switch KEY is in the ON state. However, the regular data-loss avoidance process is stopped when a load on the vehicle is high. In other words, the regular data-loss avoidance process is executed when a load on the vehicle is low.

For example, when the microcomputer detects fuel supply to the vehicle (e.g., charge (electric charge supply) to a battery for driving an electric vehicle (EV) or a hybrid electric vehicle (HEV) or hydrogen supply to a driving fuel cell of a fuel cell vehicle (FCV)), a low load on the vehicle is detectable. During fuel supply, the display of the display unit 6 with image data based on meter information is omitted, or it is simplified with image data stored in for example the RAM (low image data in volume as compared with image data stored in the NAND flash memory 1).

Furthermore, when the microcomputer detects that the vehicle is stopped, a low load on the vehicle is detectable. Moreover, when the microcomputer detects the constant speed of the vehicle, a low load on the vehicle is detectable. In addition, when a processing load on the microcomputer and/or a processing load on the graphic controller are lower than a predetermined value, the microcomputer may detect or determine that a load on the vehicle is low. Furthermore, the microcomputer may temporarily stop a data-loss avoidance process if the data-loss avoidance process is not completed when a load on the vehicle changes from a low state to a high state. In this case, the temporarily stopped data-loss avoidance process may be resumed when a load on the vehicle returns from a high state to a low state.

Hereafter, a "modification" of the first embodiment and/or the second embodiment is explained.

Figure 4:
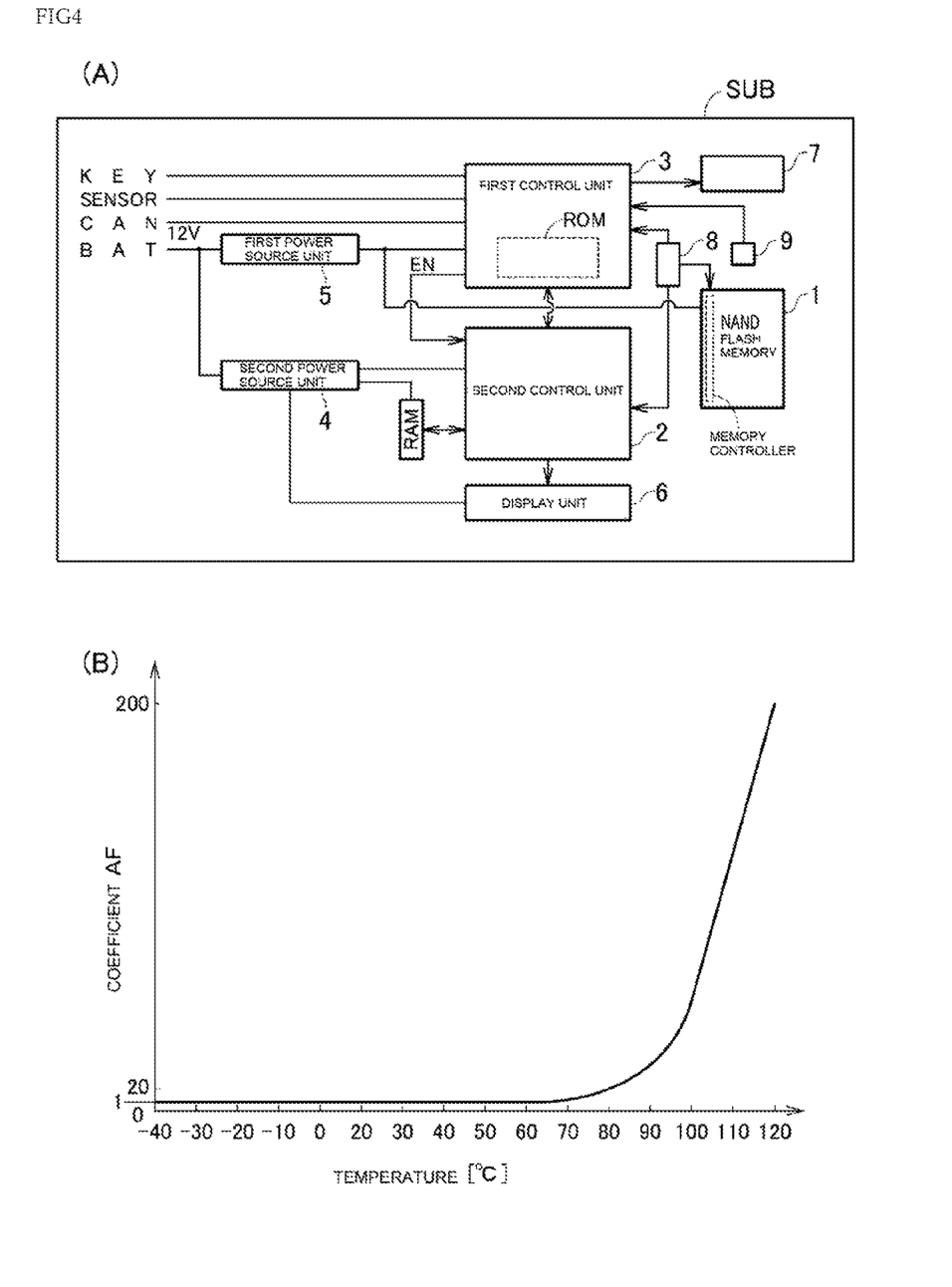
FIG. 4(A) shows a modification of the display device for a vehicle in FIG. 1(A)
FIG. 4(B) shows the relationship between a usage environment temperature and a correction coefficient.

FIG. 4(A) shows a modification of the display device for a vehicle in FIG. 1(A), and FIG. 4(B) shows the relationship between a usage environment temperature and a correction coefficient. As shown in FIG. 4(A), the display device for a vehicle may further include a temperature detecting unit 9 that detects, for example, the usage environment temperature. Furthermore, the display device for a vehicle in FIG. 1(B) and FIG. 1(C) may also further include the temperature detecting unit 9.

The temperature detecting unit 9 is preferably disposed near the NAND flash memory 1 and, for example, the temperature detecting unit 9 is installed on a substrate SUB on which the NAND flash memory 1 is mounted. Furthermore, when the temperature detecting unit 9 is not installed on the substrate SUB and the display device for a vehicle is disposed on for example the dashboard, the temperature detecting unit 9, for example, may be provided on the dashboard to detect the internal temperature of the dashboard as the temperature of the NAND flash memory 1.

The data retention period of the NAND flash memory 1, i.e., the time before data loss and bit error occurrence, or the probability thereof is based on the usage environment temperature; therefore, the first control unit 3 (typically, the microcomputer) may determine when to execute a data-loss avoidance process based on the usage environment temperature, thereby further avoiding data loss.

Specifically, as the usage environment temperature increases, the data retention period becomes shorter. Therefore, it is preferable that the higher the usage environment temperature, the more frequently a data-loss avoidance process is executed. Specifically, for example, as shown in FIG. 4(B), the count value of the counter is incremented based on a correction coefficient AF that for example increases in an exponential manner with an increase in the usage environment temperature, whereby a predetermined time such as the first predetermined time or the second predetermined time described above is measured. For example, when the correction coefficient AF is 1, the count value of the counter is incremented by 1. For example, when the correction coefficient AF is 20, the count value of the counter is incremented by 20. As an environment with a high usage environment temperature continues longer, an elapse of the predetermined time may be determined in a shorter time period at a step such as Step ST07 of FIG. 2 or Step ST21 of FIG. 3. Thus, the higher the usage environment temperature, the more frequently a data-loss avoidance process may be executed, whereby data loss in the NAND flash memory 1 may be prevented more securely.

The present invention is not limited to the embodiment shown by example above, and a person skilled in the art may easily modify the embodiment shown by example above within the range included in the scope of claims.

INDUSTRIAL APPLICABILITY

The present invention is suitable for use in a display device for a vehicle that displays vehicle information such as the travelling speed of the vehicle.

DESCRIPTION OF REFERENCE NUMERALS

1 NAND flash memory (e.g., eMMC)
2 Second control unit (e.g., graphic controller)
3 First control unit (e.g., microcomputer)
4 Second power source unit
5 First power source unit
6 Display unit
7 Indicator unit
8 Bus switch
9 Temperature detecting unit
AF Correction coefficient
BAT Direct-current power line
CAN In-vehicle network
KEY Switch
SENSOR Sensor
SUB Substrate

The invention claimed is:

1. A display device mounted in a vehicle, the display device comprising:
  a display unit which displays vehicle information;
  a NAND flash memory which stores, together with an error correction code, data related to display of the display unit;
  a control unit which causes the display unit to present the vehicle information using the data; and
  a power source unit which generates power for the display, the NAND flash memory, and the control unit even when the vehicle is OFF, the power source unit connected to a vehicle-mounted battery,
  wherein the control unit determines whether a first predetermined time elapsed since the vehicle is turned OFF,
  wherein when the control unit determines that the first predetermined time has elapsed, the control unit causes the NAND flash memory to execute a refresh process, as a data-loss avoidance process, to correct error data stored in the NAND flash memory,
  wherein the control unit includes:
    a first control unit that causes the NAND flash memory to execute the refresh process, as the data-loss avoidance process, after the first predetermined time elapses; and
    a second control unit that causes the display unit to present the vehicle information using the data, and
  wherein the power source unit includes:
    a first power source unit that supplies power to the first control unit and the NAN flash memory even when the vehicle is OFF; and
    a second power source unit that 1) supplies power to the second control unit and the display unit while the vehicle is ON and 2) stops supplying the power to the second control unit and the display unit while the vehicle is OFF.

2. The display device according to claim 1, wherein the control unit determines that the vehicle is OFF when an ignition switch is off.

3. The display device according to claim 1, wherein the control unit executes the data-loss avoidance process every time the first predetermined time elapses since the vehicle is turned OFF.

4. The display device according to claim 3, wherein the first predetermined time is set to two weeks or longer.

5. The display device according to claim 4, comprising a temperature detecting unit that detects a usage environment temperature,
  wherein the control unit sets the first predetermined time according to the detected usage environment temperature such that the higher the usage environment temperature is the shorter the first predetermined time is set.

6. The display device according to claim 1, comprising a third power source that supplies power to the first control unit and the NAND flash memory when the vehicle-mounted battery to which the power source unit is connected becomes deteriorated.

* * * * *